United States Patent

Ohyama et al.

[11] Patent Number: 5,489,003
[45] Date of Patent: Feb. 6, 1996

[54] ELECTRIC VEHICLE

[75] Inventors: Kazuo Ohyama; Kiyoshi Kimura, both of Wako, Japan

[73] Assignee: Honda Giken Kogyo Kabushiki Kaisha, Tokyo, Japan

[21] Appl. No.: 69,907

[22] Filed: May 28, 1993

[30] Foreign Application Priority Data

May 29, 1992 [JP] Japan ..................... 4-138342

[51] Int. Cl.$^6$ .................... B60K 1/00; B60L 3/00
[52] U.S. Cl. .................. 180/65.6; 180/65.1; 318/139
[58] Field of Search ................ 180/65.1, 65.6, 180/65.8; 318/139, 433, 434

[56] References Cited

U.S. PATENT DOCUMENTS

| | | | |
|---|---|---|---|
| 3,297,926 | 1/1967 | Campbell et al. | 180/65.6 X |
| 3,866,703 | 2/1975 | Eastham | 180/65.1 |
| 4,096,418 | 6/1978 | Marumoto et al. | 180/65.8 X |
| 4,419,610 | 12/1983 | Pollman | 180/65.6 X |
| 5,161,634 | 11/1992 | Ichihara et al. | 180/65.8 X |
| 5,253,724 | 10/1993 | Prior | 180/65.6 X |
| 5,289,890 | 3/1994 | Toyoda et al. | 180/65.8 |
| 5,365,431 | 11/1994 | Minezawa et al. | 180/65.8 X |

FOREIGN PATENT DOCUMENTS

| | | |
|---|---|---|
| 0127292 | 12/1984 | European Pat. Off. . |
| 0424088 | 4/1991 | European Pat. Off. . |
| 0457594 | 11/1991 | European Pat. Off. . |
| 107607 | 5/1987 | Japan . |

OTHER PUBLICATIONS

Communication from European Patent Office Patent Abstract of JP 62-107607 (English language).

*Primary Examiner*—Brian L. Johnson
*Attorney, Agent, or Firm*—Lyon & Lyon

[57] ABSTRACT

An electric vehicle has a transmission for transmitting a drive force from an electric motor to drive road wheels. The electric motor is controlled to produce a drive force depending on an amount of accelerator control. A target rotational speed is set for the electric motor depending on the amount of accelerator control. The transmission is controlled to rotate the electric motor at the target rotational speed. The target rotational speed is set as a rotational speed at which an energy efficiency of the electric motor is maximum at each of plural amounts of accelerator control below at least a predetermined amount of accelerator control.

8 Claims, 6 Drawing Sheets

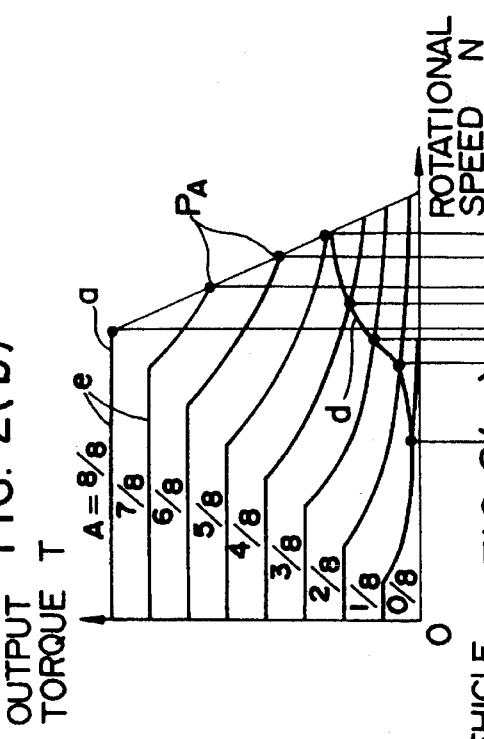
FIG. 2(b)
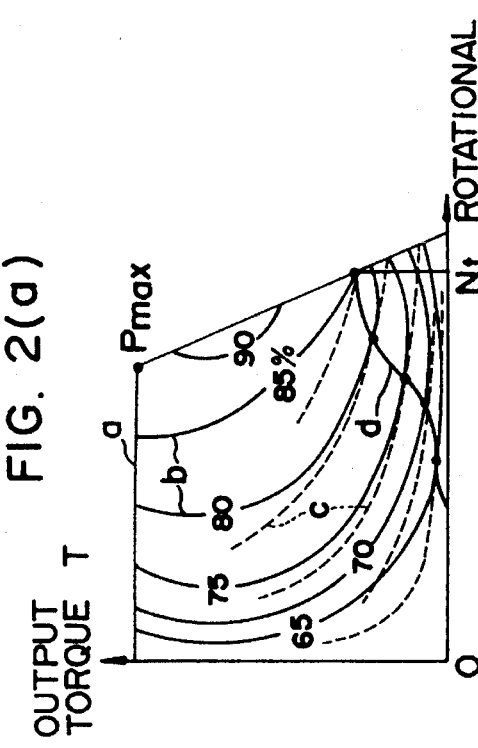
FIG. 2(a)
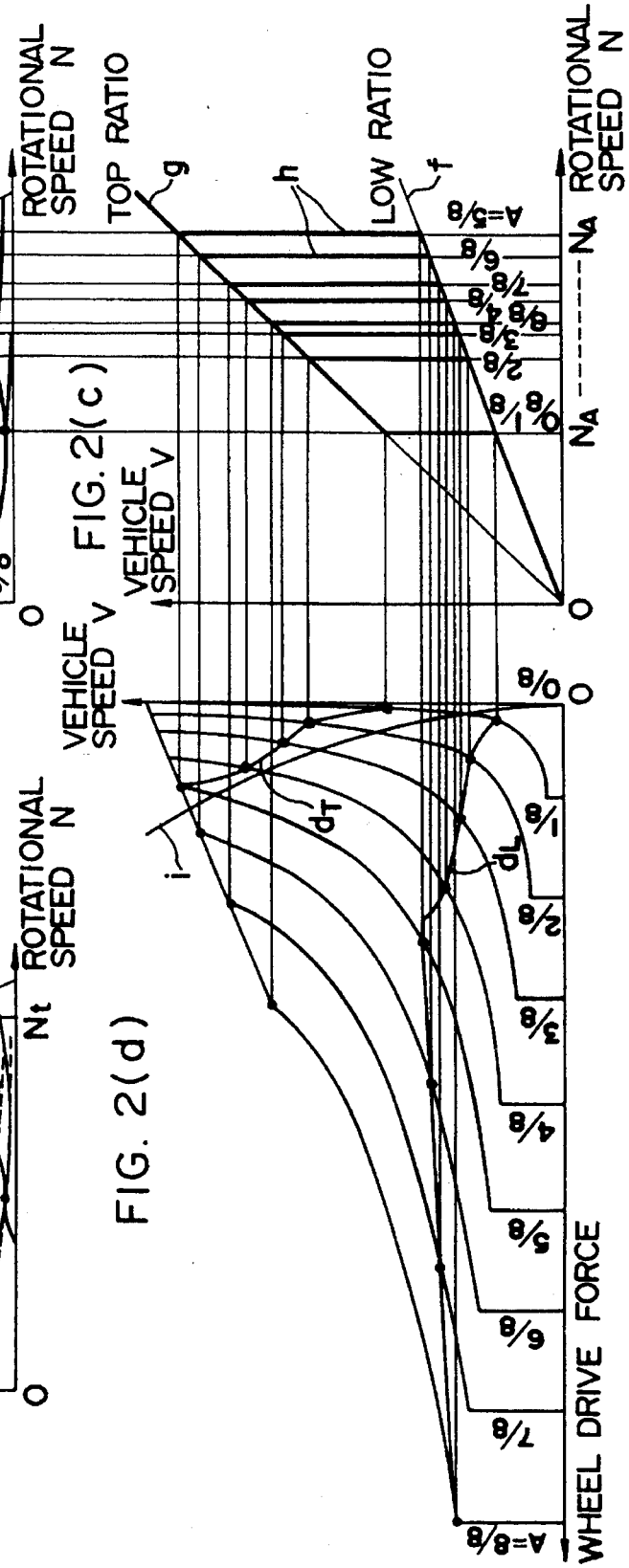
FIG. 2(c)
FIG. 2(d)

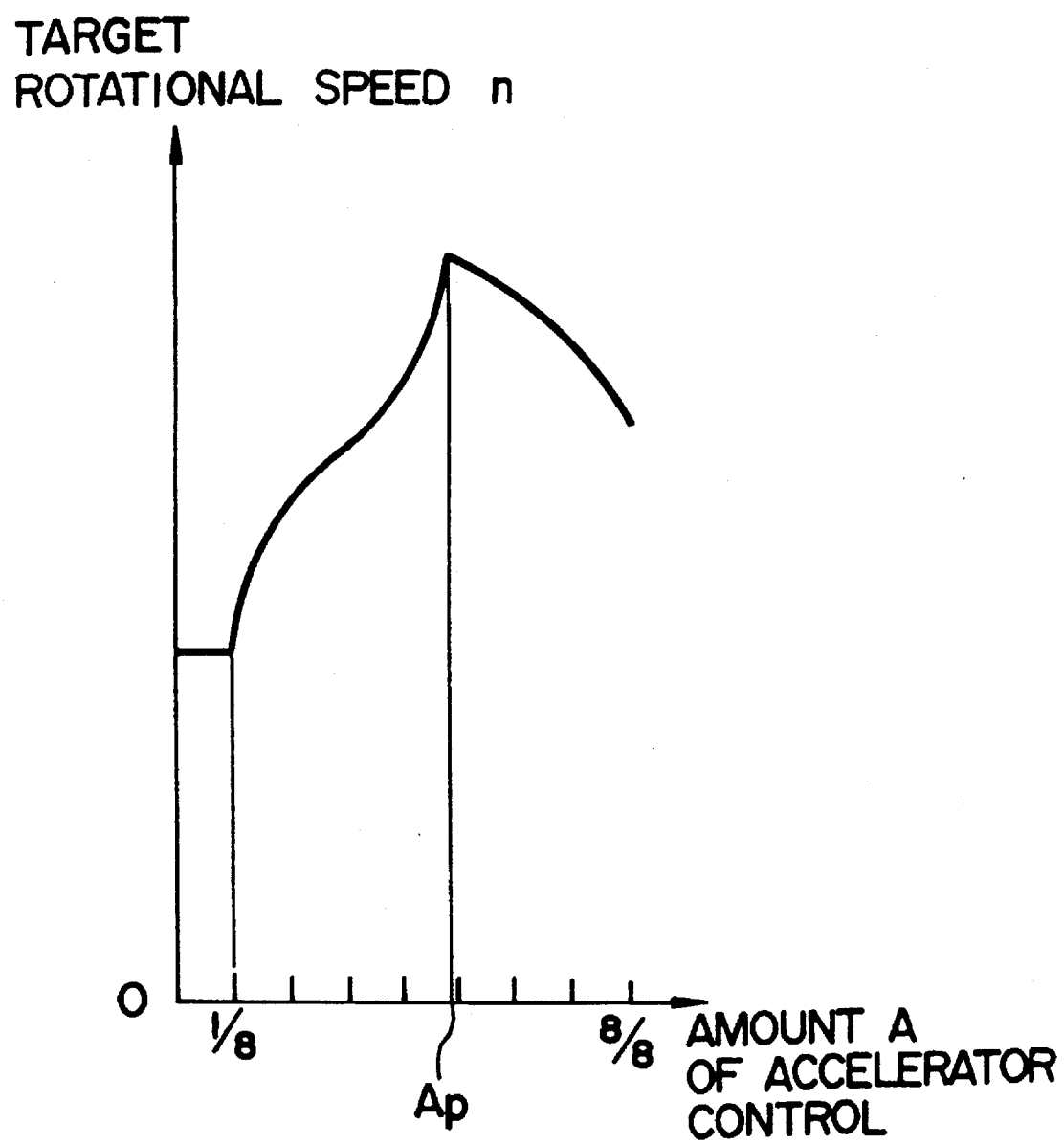

5,489,003

ELECTRIC VEHICLE

BACKGROUND OF THE INVENTION

1. Field of the Invention

The present invention relates to an electric vehicle such as an electric automobile having an electric motor for producing a drive force (output torque) to be transmitted to drive road wheels to propel the electric vehicle.

2. Description of the Prior Art

Electric automobiles have a battery for storing electric energy that is used to energize an electric motor to rotate drive road wheels. In order to increase the milage per one charging cycle for the battery, it is preferable to operate the electric motor in a high-energy efficiency range, i.e., at a high ratio of mechanical output energy produced by the electric motor to electric input energy applied to the electric motor.

One electric automobile with increased energy efficiency is disclosed in Japanese laid-open patent publication No. 62-107607, for example.

The disclosed electric automobile is designed such that the output torque and rotational speed of the electric motor are increased along a high-efficiency curve where the energy efficiency of the electric motor is highest until a target automobile speed is reached when the automobile is propelled in response to the depression of an accelerator pedal. The electric motor is thus controlled to operate in a high range of energy efficiencies.

However, since the wheel drive force of the electric vehicle, i.e., the output torque at the drive road wheels, and the vehicle speed of the electric vehicle are determined according to the output torque and rotational speed of the electric motor, the wheel drive force may often become insufficient when the electric motor is energized along the high-efficiency curve. When the wheel drive force becomes insufficient, therefore, the output torque of the electric motor is increased such that the electric motor is energized in a range far from the high-efficiency curve, i.e., in a range of relatively low energy efficiencies for the electric motor.

The electric motor is actually energized less frequently along the high-efficiency curve under actual running conditions. Inasmuch as the electric motor is not often energized in a high range of energy efficiencies, the energy efficiency of the electric motor is not sufficiently high in actual operation.

SUMMARY OF THE INVENTION

It is therefore an object of the present invention to provide an electric vehicle having an electric motor which is energized in a high range of energy efficiencies for good running performance in a variety of actual running conditions thereby to increase the energy efficiency of the electric motor.

According to an aspect of the present invention, there is provided an electric vehicle comprising drive road wheels, an electric motor for generating a drive force, a transmission for transmitting the drive force from the electric motor to the drive road wheels, electric motor control means for controlling the electric motor to produce a drive force depending on an amount of accelerator control, setting means for setting a target rotational speed for the electric motor depending on the amount of accelerator control, and transmission control means for controlling the transmission to rotate the electric motor at the target rotational speed, the setting means comprising means for setting the target rotational speed as a rotational speed at which an energy efficiency of the electric motor is maximum at each of amounts of accelerator control below at least a predetermined amount of accelerator control.

The electric motor is controlled by the electric motor control means to generate a drive force depending on the amount of accelerator control, and the drive force is transmitted through the transmission to the drive road wheels. When the amount of accelerator control is smaller than the predetermined amount of accelerator control, i.e., when the amount of accelerator control is relatively small, the transmission is controlled to rotate the electric motor at the target rotational speed which is set by the setting means as the rotational speed at which the energy efficiency of the electric motor is maximum depending on the amount of accelerator control. When the amount of accelerator control is relatively small, therefore, the electric motor is energized while keeping the rotational speed for high energy efficiency.

Generally, a range in which the energy efficiency of the electric motor is high is present in a high-speed range of the electric motor. In the high-speed range, the output torque of the electric motor decreases as the rotational speed thereof increases (see FIG. 2(a) of the accompanying drawings). Therefore, when the electric motor is energized to increase the output torque thereof as the amount of accelerator control increases, the rotational speed of the electric motor at which the energy efficiency thereof is high in each of the amounts of accelerator control increases as the amount of accelerator control increases, i.e., as the output torque increases, in a range of relatively small amounts of accelerator control, and decreases as the amount of accelerator control increases, i.e., as the output torque increases, in a range of relatively large amounts of accelerator control (see FIG. 2(b) of the accompanying drawings).

The target rotational speed is set such that it increases as the amount of accelerator control increases below the predetermined amount of accelerator control, i.e., in the range of relatively small amounts of accelerator control, and also that it decreases as the amount of accelerator control increases above the predetermined amount of accelerator control, i.e., in the range of relatively large amounts of accelerator control. Thus, in the range of relatively small amounts of accelerator control, it is possible to rotate the electric motor at a rotational speed at which the energy efficiency is maximum, and in the range of relatively large amounts of accelerator control, it is possible to rotate the electric motor at a rotational speed at which the energy efficiency is high to produce a sufficient wheel drive force for the electric vehicle.

According to another aspect of the present invention, there is also provided an electric vehicle comprising drive road wheels, an electric motor for generating a drive force, a transmission for transmitting the drive force from said electric motor to said drive road wheels, electric motor control means for controlling said electric motor to produce a drive force depending on an amount of accelerator control, and transmission control means for controlling said transmission to rotate said electric motor at a rotational speed at which an energy efficiency of said electric motor is maximum at each of amounts of accelerator control.

With the above arrangement, it is possible to increase the energy efficiency of the electric vehicle because the transmission is controlled for a speed change such that the rotational speed of the electric motor becomes a rotational speed at which the energy efficiency thereof is maximum.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 2(a) through 2(d) are diagrams showing characteristic curves of the electric vehicle;

FIG. 3 is a diagram showing a characteristic curve of the electric vehicle;

DETAILED DESCRIPTION OF THE PREFERRED EMBODIMENT

Figure 1:
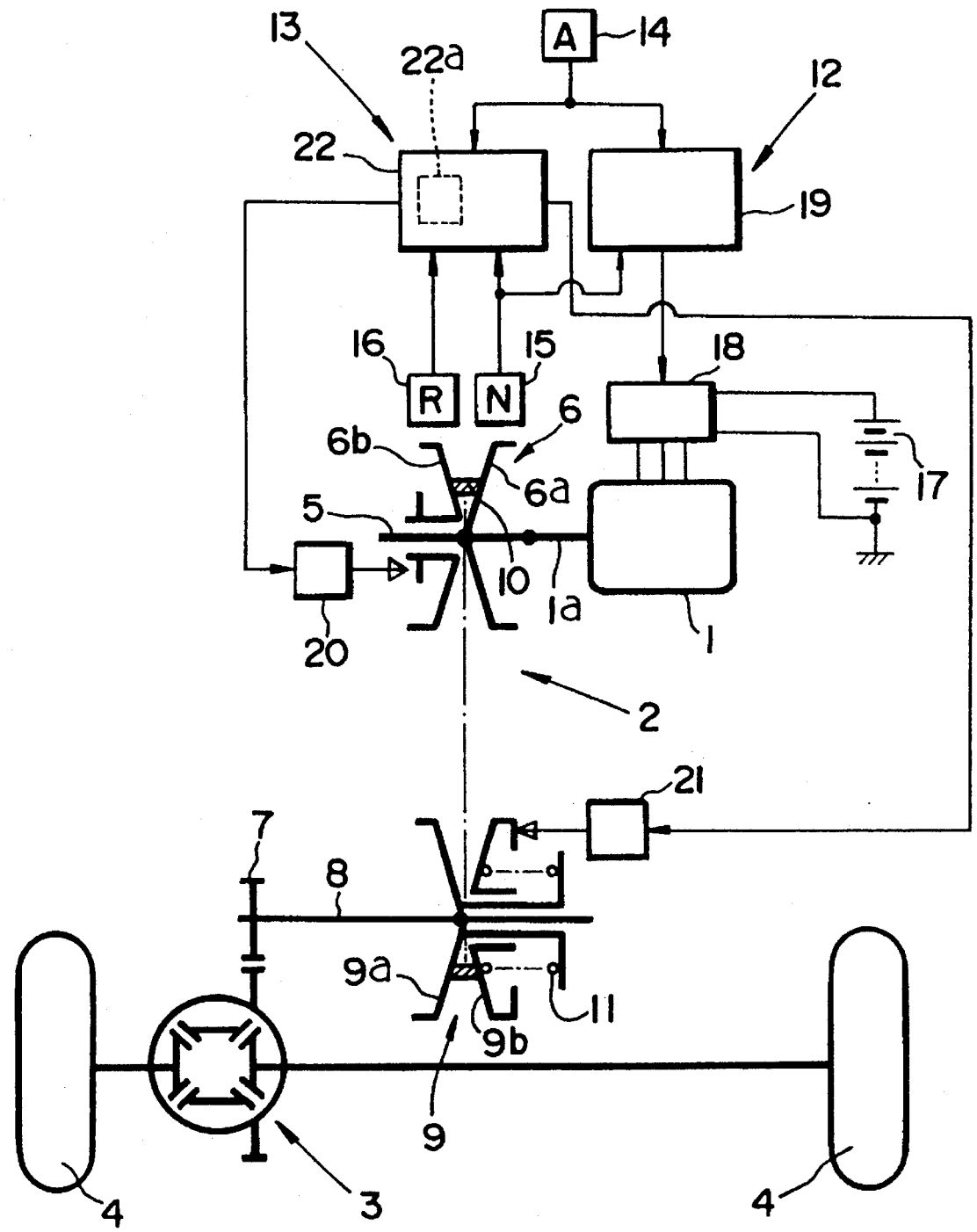
FIG. 1 is a schematic view of an electric vehicle according to the present invention.
Figure 4:
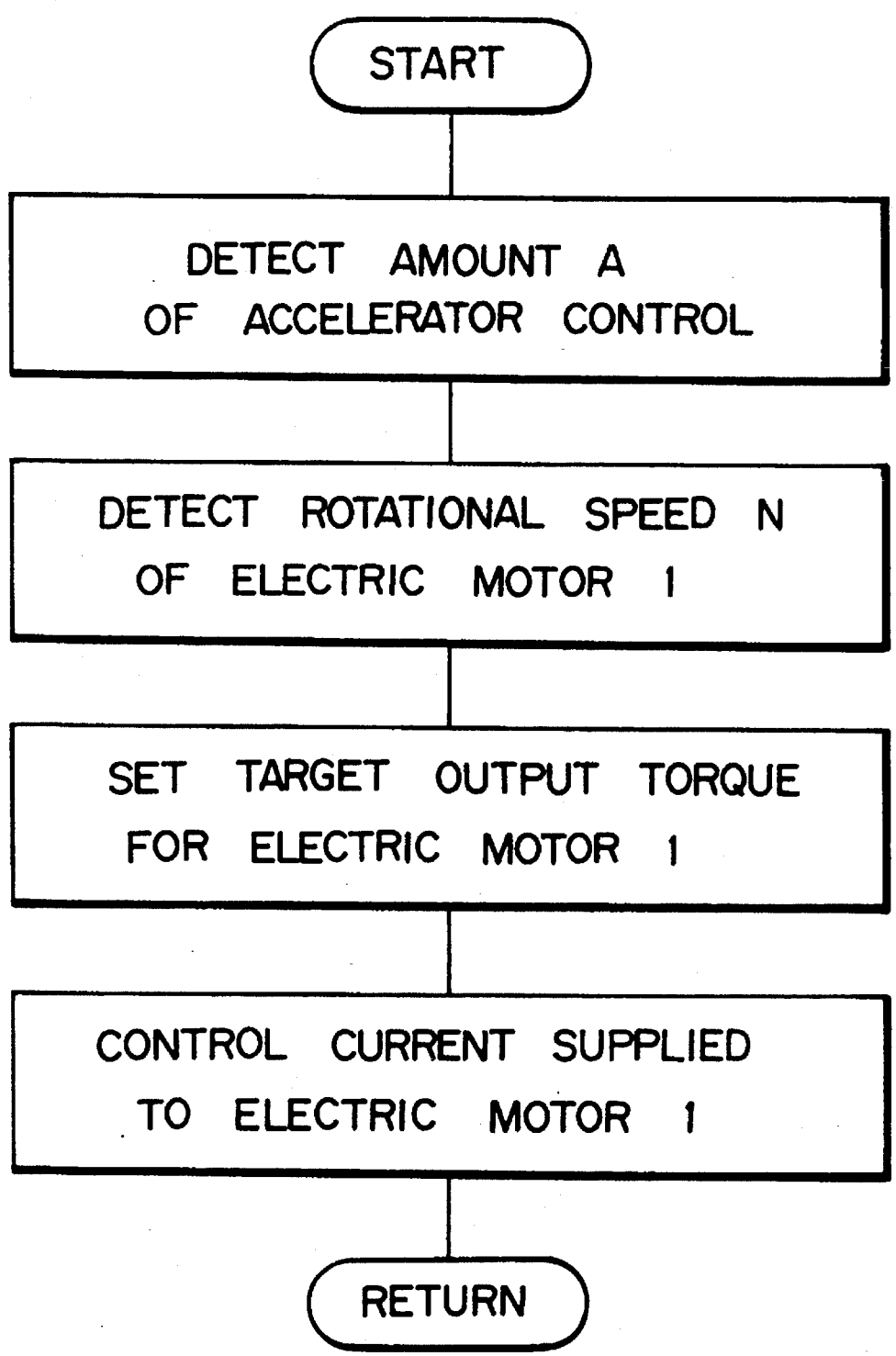
FIG. 4 is a flowchart of an operation sequence of the electric vehicle.

As shown in FIG. 1, an electric vehicle such as an electric automobile according to the present invention generally comprises an electric motor 1 for propelling the electric vehicle, a belt-and-pulley continuously variable transmission 2, a differential gear mechanism 3, and a pair of drive road wheels 4. The drive force generated by the electric motor 1 is transmitted through the continuously variable transmission 2 and the differential gear mechanism 3 to the drive road wheels 4 to propel the electric vehicle The continuously variable transmission 2 comprises a drive pulley 6 composed of a fixed drive pulley member 6a coupled for co-rotation to an input shaft 5 connected to a drive shaft 1a of the electric motor 1 and a movable driven pulley member 6b rotatably supported on the input shaft 5 for axial movement toward and away from the fixed drive pulley member 6a , a driven pulley 9 composed of a fixed driven pulley member 9a coupled for co-rotation to an output shaft 8 connected to the differential gear mechanism 3 through a gear 7 and a movable driven pulley member 9b rotatably supported on the output shaft 8 for axial movement toward and away from the fixed driven pulley member 9a , a V belt 10 trained around the drive and driven pulleys 6, 9, and a spring 10 for normally urging the movable driven pulley member 9b toward the fixed driven pulley member 9a . The continuously variable transmission 2 is of a known structure.

The drive force applied from the electric motor 1 to the input shaft 5 is transmitted through the drive pulley 6, the V belt 10, and the driven pulley 9 to the output shaft 8. When the movable pulley member 6b of the drive pulley 6 is moved toward or away from the fixed pulley member 6a thereof and the movable pulley member 9b of the driven pulley 9 is moved toward or away from the fixed pulley member 9a thereof, the effective diameter of the V belt 10 around the drive and driven pulleys 6, 9 is continuously varied to change the speed of relative rotation of the input and output shafts 5, 8. The power transmission capacity, i.e., the torque transmission capacity, of the continuously variable transmission 2 is adjusted when a load is applied to the movable pulley member 9b of the driven pulley 9 in a direction to move the movable pulley member 9b toward or away from the fixed pulley member 9a to adjust the force with which the V belt 10 is held in contact with the driven pulley 9.

The electric vehicle also has an electric motor control unit 12 for controlling operation of the electric motor 1, a transmission control unit 13 for controlling speed-change operation of the continuously variable transmission 2, an accelerator sensor 14 for detecting the amount A of operation of the accelerator of the electric vehicle, a rotational speed sensor 15 for detecting the rotational speed N of the drive pulley 6, which is equal to the rotational speed N of the electric motor 1, and a ratio sensor 16 for detecting the speed reduction ratio R of the continuously variable transmission 2.

The electric motor control unit 12 comprises a driver circuit 18 connected between the electric motor 1 and a battery 17 mounted on the vehicle body as a power supply for the electric motor 1, and a controller 19 for controlling operation of the driver circuit 18. The controller 19 controls the driver circuit 18 to supply stored electric energy from the battery 17 through the driver circuit 18 to the electric motor 1 for thereby energizing the electric motor 1.

As described later on, the controller 19 controls operation of the electric motor 1 through the driver circuit 18 according to drive characteristics that have been determined based on the amount A of accelerator control detected by the accelerator sensor 14 and the rotational speed N of the electric motor 1 detected by the rotational speed sensor 15.

The transmission control unit 13 comprises an actuator 20 for applying a load to the movable pulley member 6b of the drive pulley 6 for actuating the continuously variable transmission 2 for a speed change, an actuator 21 for applying a load to the movable pulley member 9b of the driven pulley 9 for adjusting the power transmission capacity, i.e., the torque transmission capacity, of the continuously variable transmission 2, and a controller 22 for controlling operation of these actuators 20, 21. As described later on, the controller 22 has a setting unit 22a for setting a target rotational speed for the drive pulley 6, i.e., a target rotational speed for the electric motor 1, based on the amount A of accelerator control detected by the accelerator sensor 14. The controller 22 controls the continuously variable transmission 2 through the actuator 20 so that the rotational speed N of the electric motor 1 will reach the target rotational speed. The controller 22 also adjusts the power transmission capacity, i.e., the torque transmission capacity, of the continuously variable transmission 2, through the actuator 21 based on the speed reduction ratio R detected by the ratio sensor 16.

An operation sequence for controlling the electric motor 1 with the electric motor control unit 12 will be described in detail below.

FIG. 2(a) shows rotational speed vs. output torque characteristics of the electric motor 1 if the electric motor 1 comprises a DC brushless motor.

FIG. 2(a) illustrates a maximum output torque curve a indicative of the rotational speed vs. output torque characteristics of the electric motor 1 when the electric motor 1 is energized to produce a maximum output torque with a maximum current that can be supplied to the electric motor 1. The electric motor 1 is energized in a range surrounded by the maximum-output torque curve a. FIG. 2(a) also illustrates equal-efficiency curves b which interconnect operating points where energy efficiencies (the ratio of the output energy to the input energy) of the electric motor 1 are equal, equal-output curves c which interconnect operating points where output energies of the electric motor 1 are equal, and a high-efficiency curve d which interconnects operating points where maximum energy efficiencies on the equal-output curves c are obtained. When the electric motor 1 is energized at an operating point on the high-efficiency curve d at desired output energy, the output energy of the electric motor 1 can be produced most efficiently.

The range in which the energy efficiency of the electric motor 1 is highest is present in a high-speed range in which the output torque T of the electric motor 1 drops along the maximum output torque curve a as the rotational speed N increases. As the output energy of the electric motor 1 increases, the operating point on the high-efficiency curve d moves from a low-speed range to the high-speed range. At a rotational speed Nt, the operating point on the high-efficiency curve d intersects with the maximum output torque curve a. Thereafter, the operating point moves along the maximum output torque curve a to a maximum output operating point Pmax where the output energy of the electric motor 1 becomes maximum. When the output energy of the electric motor 1 is increased along the high-efficiency curve d, the output torque T of the electric motor also increases. Therefore, when the output torque of the electric motor 1 is increased along high-efficiency curve d, the rotational speed N of the electric motor 1 rises up to a rotational speed Nt as the output torque becomes greater, and thereafter drops as the output torque becomes higher. The above characteristics of the high-efficiency curve d are generally recognized on electric motors that can be used on electric vehicles.

FIG. 2(b) shows curves e of rotational speed vs. output torque characteristics (hereinafter referred to as electric motor drive characteristics) of the electric motor 1 for various respective amounts A of accelerator control. The electric motor drive characteristics of the electric motor 1 are the same as the maximum output torque curve a (see FIG. 2(a) when the amount A of accelerator control is of a maximum value of 8/8. As the amount A of accelerator control decreases below the maximum amount of accelerator control, the output torque T of the electric motor 1 decreases.

The electric motor control unit 12 has a map or other stored data representing the electric motor drive characteristics of the electric motor 1 with respect to the various respective amounts A of accelerator control. As shown in FIG. 3, a target output torque for the electric motor 1 is established from the electric motor drive characteristics based on the amount A of accelerator control detected by the accelerator sensor 14 and the rotational speed N of the electric motor 1 detected by the rotational speed sensor 15 at a predetermined interval of time, and the electric current supplied to the electric motor 1 is controlled by the driver circuit 18 in order to achieve the target output torque. The electric motor 1 is now energized on the curve e shown in FIG. 2(b) which corresponds to the detected amount A of accelerator control.

FIG. 2(b) illustrates operating points $P_A$ (hereinafter referred to as high-efficiency operating points $P_A$) where the energy efficiency of the electric motor 1 with the above characteristics is highest on the respective amounts A of accelerator control. The curves e and the high-efficiency curve d intersect with each other at the high-efficiency operating points $P_A$.

The continuously variable transmission 2 is controlled for a speed change by the transmission control unit 13 as follows:

FIG. 2(c) shows speed-change characteristics of the continuously variable transmission 2 which are determined in advance with respect to the electric motor 1 that has the above characteristics.

FIG. 2(c) illustrates straight lines f, g representing the relationship between the vehicle speed V and the rotational speed N of the electric motor 1 at a speed reduction ratio for a minimum speed (hereinafter referred to as a low ratio) and a speed reduction ratio for a maximum speed (hereinafter referred to as a top ratio), and straight lines h representing speed-change characteristics of the continuously variable transmission 2 at the respective amounts A of accelerator control. As indicated by the straight lines h, the speed-change characteristics at the respective amounts A of accelerator control are such that the electric motor 1 is energized at a high-efficiency operating point $P_A$ (see FIG. 2(b)) on the high-efficiency curve d, i.e., the rotational speed N of the electric motor 1 is maintained at a rotational speed $N_A$ where the energy efficiency is highest (hereinafter referred to as high-efficiency rotational speed $N_A$).

Figure 5:
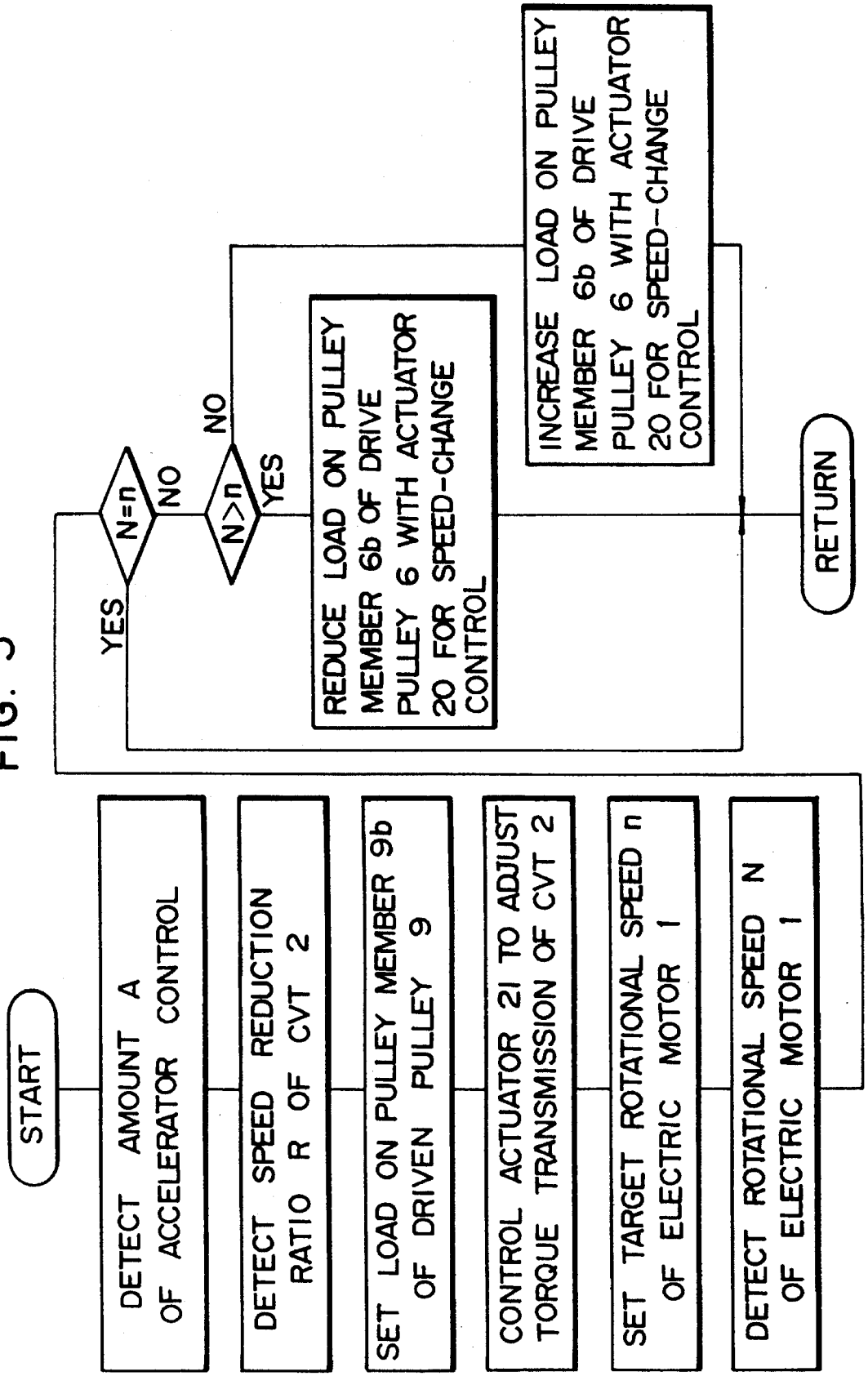
FIG. 5 is a flowchart of an operation sequence of the electric vehicle.

The transmission control unit 13 controls the continuously variable transmission 2 to operate the same with the above speed-change characteristics according to the flowchart shown in FIG. 5 at predetermined intervals of time.

More specifically, as shown in FIG. 5, the transmission control unit 13 detects the amount A of accelerator control and the speed reduction ratio R through the accelerator sensor 14 and the ratio sensor 16, sets a load to be applied to the movable pulley member 9b of the driven pulley 9 by the actuator 21 based on the detected amount A and the detected speed reduction ratio R according to predetermined rules, and operates the actuator 21 to generate the set load. The power transmission capacity, i.e., the torque transmission capacity, of the continuously variable transmission 2 is thus adjusted.

Then, the transmission control unit 13 sets a target value (hereinafter referred to as target rotational speed n) for the rotational speed N of the electric motor 1, i.e., the rotational speed of the drive pulley 6, based on the detected amount A of accelerator control. The target rotational speed n is set, by the setting unit 22a, to be a rotational speed at which the energy efficiency of the electric motor 1 is highest at the detected amount A of accelerator control. That is, the high-efficiency rotational speed $N_A$ is set as the target rotational speed n.

If N>n, then the transmission control unit 13 reduces the load applied to the movable pulley member 6b of the drive pulley 6 by the actuator 20. If N<n, then the transmission control unit 13 increases the load applied to the movable pulley member 6b of the drive pulley 6 by the actuator 20. In this manner, the continuously variable transmission 2 is controlled for a speed change to equalize the rotational speed N thereof with the target rotational speed n. As is apparent from the high-efficiency curve d, as the amount A of accelerator control increases, the target rotational speed n increases and then decreases as shown in FIG. 3. The target rotational speed n has a maximum value at a predetermined amount Ap of accelerator control.

When the amount A of accelerator control is 1/8 or less, the target rotational speed n is constant. The reason for the constant target rotational speed n is as follows: If the rotational speed N of the electric motor 1, i.e., the rotational speed N of the drive pulley 6, were excessively lowered in a range in which the amount A of accelerator control is small, the speed reduction ratio would possibly not return to the low ratio because of the nature of the continuously variable transmission 2, making it difficult to start the electric vehicle smoothly after the electric vehicle is stopped. To prevent such a problem from occurring, the speed reduction ratio R of the continuously variable transmission 2 is returned quickly to the low ratio in the range in which the amount A of accelerator control is so small that the electric vehicle may be stopped.

Overall operation of the electric vehicle thus constructed will be described below.

As described above, the electric motor 1 of the electric vehicle is energized by the electric motor control unit 12 according to the electric motor drive characteristics shown in FIG. 2(b) according to the amount A of accelerator control detected by the accelerator sensor 14 and the rotational speed N of the electric motor 1 detected by the rotational speed sensor 15. At this time, the speed-change operation of the continuously variable transmission 2 is basically controlled such that the rotational speed N of the electric motor 1 becomes the target rotational speed n set by the setting unit 22a as the rotational speed at which the energy efficiency of the electric motor 1 is high. The electric motor 1 is basically energized at an operating point on the high-efficiency curve d.

More specifically, the characteristics of the wheel drive force applied to the drive road wheels 4, i.e., the torque applied the drive road wheels 4, with respect to the vehicle speed V are a combination of the electric motor drive characteristics shown in FIG. 2(b) and the speed-change characteristics of the continuously variable transmission 2 shown in FIG. 2(c), as shown in FIG. 2(d).

FIG. 2(d) illustrates high-efficiency curves $d_L$, $d_T$ representing operating points where the energy efficiency of the electric motor 1 is maximum with respect to the respective amounts A of accelerator control at the low and top ratios of the continuously variable transmission 2. With the electric motor drive characteristics and the speed-change characteristics according to the present invention, the speed-change operation of the continuously variable transmission 2 is carried out in a range surrounded by the high-efficiency curves $d_L$, $d_T$.

In this speed-change range, since the rotational speed N of the electric motor 1 is maintained at the target rotational speed n, i.e., at the rotational speed $N_A$ where the energy efficiency of the electric motor 1 with respect to the amount A of accelerator control is highest, the electric motor 1 is energized at an operating point on the high-efficiency curve d (see FIG. 2(b)) at all times. In this embodiment, by setting a range of the speed reduction ratio R of the continuously variable transmission 2 to a suitable value, a running resistance curve i indicating a wheel drive force required to drive the electric vehicle at a constant vehicle speed V is present in the above speed-change range, and wheel drive forces, i.e., forces that can accelerate the electric vehicle, greater than forces indicated by the running resistance curve i are produced in most or that portion of the speed-change range. Therefore, the electric motor 1 can be energized efficiently in various running conditions including an accelerated condition, a constant-speed running condition, etc. to allow the electric vehicle to have sufficient accelerating performance and good power performance.

Operation of the electric vehicle in a specific running pattern will be described below with reference to FIGS. 6(a) through 6(c).

It is assumed that the electric vehicle is started with the amount A of accelerator control being ⁴⁄₈. The electric motor 1 is energized by the electric motor control unit 12 to operate at an operating point on a curve $e_4$ (see FIG. 6(a)) representative of the electric motor drive characteristics corresponding to A=⁴⁄₈. The output torque T of the electric motor 1 is transmitted through the continuously variable transmission 2 to the drive road wheels 4 thereby to start the electric vehicle. As the electric vehicle is started, the rotational speed N of the electric motor 1 increases from 0 rpm along the curve $e_4$.

Figure 6A:
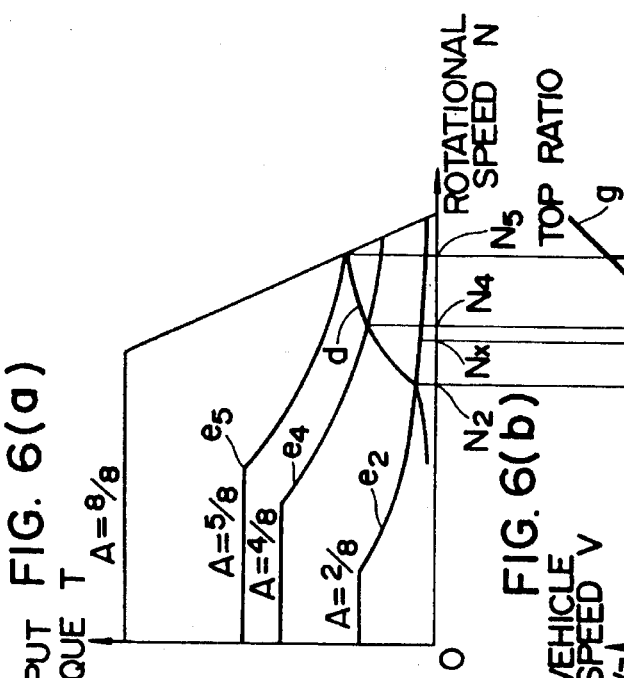
FIGS. 6(a) through 6(c) are diagrams showing characteristic curves of the electric vehicle.
Figure 6B:
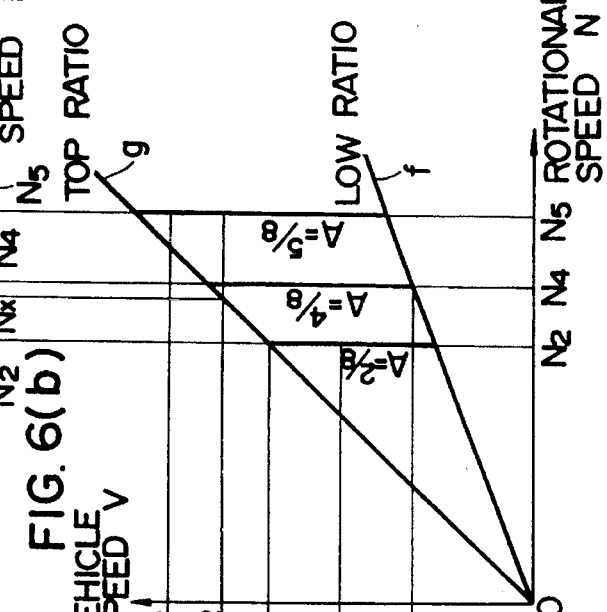

Until the vehicle speed V of the electric vehicle reaches a vehicle speed $V_1$ (see FIG. 6(b)), the output torque of the electric motor 1 is transmitted to the drive road wheels 4 at the speed reduction ratio represented by the straight line f, i.e., the low ratio, thereby accelerating the electric vehicle. When the vehicle speed $V_1$ is reached, the transmission control unit 13 starts operating the continuously variable transmission 2 for a speed change, i.e., for varying the speed reduction ratio from the low ratio to the top ratio. Specifically, when the vehicle speed V reaches the vehicle speed $V_1$, the rotational speed N of the electric motor 1 reaches a rotational speed $N_4$ where the energy efficiency is highest at A =⁴⁄₈, i.e., a rotational speed $N_4$ where the curve $e_4$ corresponding to A =⁴⁄₈ and the high-efficiency curve d intersect with each other. After the vehicle speed V has reached the vehicle speed $V_1$, the transmission control unit 13 varies the speed reduction ratio of the continuously variable transmission from the low ratio toward the top ratio as the vehicle speed V rises to keep the rotational speed N of the electric motor 1 at the rotational speed $N_4$ where the energy efficiency is highest.

Figure 6C:
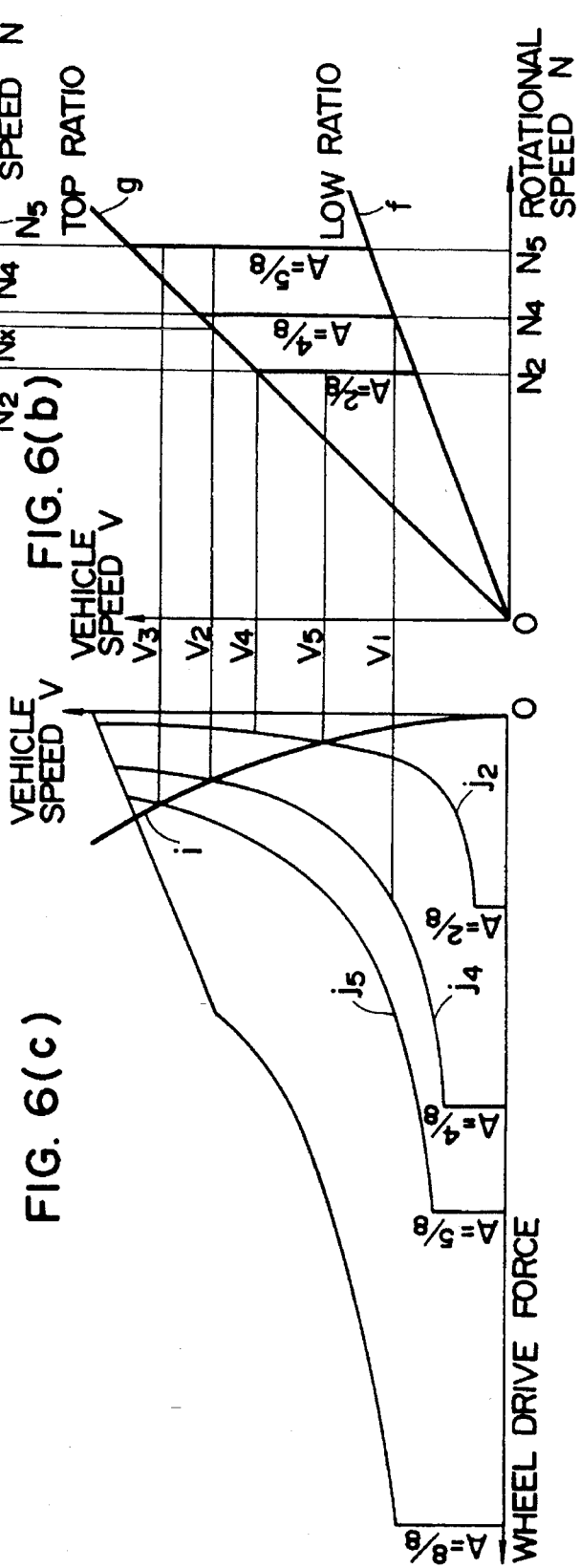

At this time, the wheel drive force is above the running resistance curve i shown in FIG. 6(c), i.e., is greater than the running resistance, and varies along a curve $j_4$ corresponding to A =⁴⁄₈.

With the amount A of accelerator control being continuously kept at ⁴⁄₈, the electric vehicle is accelerated until a vehicle speed $V_2$ is reached. When the speed $V_2$ is reached, since the wheel drive force and the running resistance are equalized with each other, stated otherwise, since the curve $j_4$ corresponding to A=⁴⁄₈ and the running resistance curve i intersect with each other, the electric vehicle subsequently runs at the constant speed. As shown in FIG. 6(b), the rotational speed of the electric motor 1 is maintained at the rotational speed $N_4$ where the energy efficiency is highest. The speed reduction ratio of the continuously variable transmission 2 is also kept at a constant speed reduction ratio.

When the amount A of accelerator control is increased to ⁵⁄₈, for example, while the electric vehicle is running at the constant speed $V_2$, the electric motor 1 is energized by the electric motor control unit 12 to operate at an operating point on a curve $e_5$ (see FIG. 6(a)) indicative of the electric motor drive characteristics corresponding to A=⁵⁄₈. As shown in FIG. 6(b), the speed reduction ratio of the continuously variable transmission 2 varies toward the low ratio. The rotational speed of the electric motor 1 now varies to a rotational speed $N_5$ where the energy efficiency is highest at A =⁵⁄₈. Inasmuch as the wheel drive force becomes larger than the running resistance at this time as shown in FIG. 6(c), the electric vehicle is accelerated. When the electric vehicle reaches a vehicle speed $V_3$ where the wheel drive force is equal to the running resistance, the electric vehicle subsequently runs at the constant speed. As the vehicle speed V changes from $V_2$ to $V_3$, the speed reduction ratio of the continuously variable transmission 2 gradually varies from a lower ratio toward the top ratio, and the rotational speed of the electric motor 1 is maintained at the rotational speed $N_5$ where the energy efficiency is highest.

When the amount A of accelerator control is reduced to ²⁄₈, for example, while the electric vehicle is running at the constant speed $V_2$ with A=⁴⁄₈, the electric motor 1 is energized by the electric motor control unit 12 to operate at an operating point on a curve $e_2$ (see FIG. 6(a)) indicative of the electric motor drive characteristics corresponding to A=⅖. As shown in FIG. 6(b), the speed reduction ratio of the continuously variable transmission 2 varies to the top ratio. The rotational speed of the electric motor 1 now varies to a rotational speed $N_x$ where the energy efficiency is highest at A=⅖, the rotational speed $N_x$ being slightly higher than the rotational speed $N_2$.

Inasmuch as the wheel drive force becomes smaller than the running resistance at this time as shown in FIG. 6(c), the vehicle speed V decreases from the vehicle speed $V_2$, and so does the rotational speed of the electric motor.

When the vehicle speed V decreases to a vehicle speed $V_4$, and the rotational speed of the electric motor 1 reduces to the rotational speed $N_2$ where the energy efficiency is highest at A=⅖, the continuously variable transmission 2 starts effecting a speed change, i.e., varying the speed reduction ratio from the top ratio toward the low ratio as the vehicle speed V decreases. The rotational speed of the electric motor 1 is maintained at the rotational speed $N_2$ where the energy efficiency is highest. The vehicle speed V is reduced to a vehicle speed $V_5$ at which the wheel drive force is equal to the running resistance at A=⅖. Subsequently, the vehicle runs at the constant speed $V_5$.

As described above, the speed-change characteristics of the continuously variable transmission 2 are selected such that the rotational speed N of the electric motor 1 is maintained at the target rotational speed n where the energy efficiency thereof is high, basically depending on the amount A of accelerator control. The electric vehicle can thus run mostly in a range of high energy efficiencies in various running conditions, with sufficient wheel drive forces. The milage of the electric vehicle per one cycle of charging the battery 17 is increased, and the electric vehicle exhibits good power performance. The highly efficient operation of the electric motor 1 is achieved by setting the characteristics of the target rotational speed n, which determines the speed-change characteristics of the continuously variable transmission 2, with respect to the amount A of accelerator control to those characteristics which have a maximum value at an amount A of accelerator control below the maximum amount of accelerator control, as shown in FIG. 3.

While the continuously variable transmission 2 has been illustrated and described in the above embodiment, the electric vehicle may incorporate any of various other automatic transmissions for higher energy efficiency.

Although a certain preferred embodiment of the present invention has been shown and described in detail, it should be understood that various changes and modifications may be made therein without departing from the scope of the appended claims.

What is claimed is:

1. An electric vehicle comprising:

drive road wheels;

an electric motor for generating a drive force;

a transmission connected between said electric motor and said drive road wheels for transmitting the drive force from said electric motor to said drive road wheels at various rotational speed ratios;

electric motor control means for controlling said electric motor to produce a drive force depending no an amount of accelerator control;

setting means for setting a target rotational speed for said electric motor depending on said amount of accelerator control; and transmission control means for controlling the rotational speed ratio of said transmission to cause said electric motor to rotate at substantially said target rotational speed;

said setting means comprising means for setting the target rotational speed as a rotational speed of said electric motor at which an energy efficiency of said electric motor is maximum at each of plural amounts of accelerator control below at least a predetermined amount of accelerator control.

2. An electric vehicle according to claim 1, wherein said target rotational speed is set such that the target rotational speed is increased as said amount of accelerator control below said predetermined amount of accelerator control is increased, and reduced as said amount of accelerator control above said predetermined amount of accelerator control is increased.

3. An electric vehicle according to claim 1, wherein said transmission is a continuously variable transmission.

4. An electric vehicle according to claim 1 wherein said setting means includes a look-up map having values of rotational speed vs. output torque for said electric motor for each said amount of accelerator control, and said setting of said target rotational speed for said electric motor is based on said look-up map.

5. An electric vehicle comprising:

drive road wheels;

an electric motor for generating a drive force;

a transmission connected between said electric motor and said drive road wheels for transmitting the drive force from said electric motor to said drive road wheels at various rotational speed ratios;

electric motor control means for controlling said electric motor to produce a drive force depending on an amount of accelerator control; and transmission control means for controlling the rotation speed ratio of said transmission to cause said electric motor to rotate at a selected rotational speed at which an energy efficiency of said electric motor is maximum at each of plural amounts of accelerator control.

6. An electric vehicle according to claim 5, wherein a target rotational speed is set such that said selected rotational speed at which said energy efficiency of said electric motor is maximum is increased as said amount of accelerator control below a predetermined amount of accelerator control is increased, and reduced as said amount of accelerator control above said predetermined amount of accelerator control is increased.

7. An electric vehicle according to claim 5, wherein said transmission is a continuously variable transmission.

8. An electric vehicle according to claim 5, wherein said electric motor control means includes a look-up map having values of rotational speed vs. output torque for said electric motor for each said amount of accelerator control, and said selected rotational speed of said electric motor depending on said amount of accelerator control is based on said look-up map.

\* \* \* \* \*